(12) United States Patent
Ito (10) Patent No.: US 7,263,715 B2
(45) Date of Patent: Aug. 28, 2007

(54) COMMUNICATIONS TERMINAL OPERABLE WITH HIGH SECURITY PROTOCOL

(75) Inventor: Toshiyuki Ito, Toyohashi (JP)

(73) Assignee: DENSO Corporation, Kariya (JP)

( * ) Notice: Subject to any disclaimer, the term of this patent is extended or adjusted under 35 U.S.C. 154(b) by 916 days.

(21) Appl. No.: 10/277,434

(22) Filed: Oct. 22, 2002

(65) Prior Publication Data

US 2003/0084338 A1    May 1, 2003

(30) Foreign Application Priority Data

Oct. 30, 2001  (JP)  ............................. 2001-332743
Aug. 9, 2002   (JP)  ............................. 2002-232921

(51) Int. Cl.
*G06F 17/30* (2006.01)
*G06F 7/04* (2006.01)
*G06K 9/00* (2006.01)
*H04L 9/32* (2006.01)
*H03M 1/68* (2006.01)
*H04K 1/00* (2006.01)

(52) U.S. Cl. ............................................ 726/2; 726/27
(58) Field of Classification Search .................... 726/2, 726/27
See application file for complete search history.

(56) References Cited

U.S. PATENT DOCUMENTS 6,078,581 A   6/2000  Shtivelman et al.
6,259,692 B1  7/2001  Shtivelman et al.
6,295,293 B1  9/2001  Tönnby et al.

(Continued)

FOREIGN PATENT DOCUMENTS

JP   02-159157   6/1990

(Continued)

OTHER PUBLICATIONS

Examination Report from corresponding JP Application No. 2002-232921 dated Aug. 16, 2006.

(Continued)

*Primary Examiner*—Kambiz Zand
*Assistant Examiner*—Michael J. Simitoski
(74) *Attorney, Agent, or Firm*—Harness, Dickey & Pierce, PLC (57) ABSTRACT

A mobile phone connected to the Internet determines whether an emergency communications request for a designated IP address is received, and terminates the telephone line connection when the emergency communications request is received. When the telephone line connection is disconnected, the mobile phone awaits a call from an emergency communications server in order to handle the emergency communications request. When the call is received from the emergency communications server, the mobile phone connects by a telephone line to the emergency communications server and communicates by way of a dedicated protocol with the emergency communications server.

8 Claims, 5 Drawing Sheets

U.S. PATENT DOCUMENTS

| | | | |
|---|---|---|---|
| 6,320,857 | B1 | 11/2001 | Tönnby et al. |
| 6,338,140 | B1 * | 1/2002 | Owens et al. ............... 713/168 |
| 6,457,039 | B1 | 9/2002 | Fogelholm et al. |
| 6,515,996 | B1 | 2/2003 | Tönnby et al. |
| 6,526,043 | B1 | 2/2003 | Fogelholm et al. |
| 6,625,651 | B1 * | 9/2003 | Swartz et al. ............... 709/226 |
| 6,898,640 | B1 * | 5/2005 | Kurita et al. ............... 709/238 |
| 6,965,816 | B2 * | 11/2005 | Walker ....................... 701/16 |
| 6,975,710 | B2 | 12/2005 | Fujino et al. |
| 2002/0016838 | A1 * | 2/2002 | Geluc et al. ................ 709/224 |
| 2002/0118676 | A1 | 8/2002 | Tönnby et al. |
| 2002/0133721 | A1 * | 9/2002 | Adjaoute .................... 713/201 |
| 2005/0265320 | A1 | 12/2005 | Fujino et al. |

FOREIGN PATENT DOCUMENTS

| | | |
|---|---|---|
| JP | 04-097641 | 3/1992 |
| JP | A-2001-292233 | 10/2001 |

OTHER PUBLICATIONS

Office Action dated Apr. 25, 2007 in corresponding Japanese Application No. 2002-232921 with English translation.

* cited by examiner

COMMUNICATIONS TERMINAL OPERABLE WITH HIGH SECURITY PROTOCOL

CROSS REFERENCE TO RELATED APPLICATION

This application is based on and incorporates herein by reference Japanese Patent Applications No. 2001-332743 filed Oct. 30, 2001 and No. 2002-232921 filed Aug. 9, 2002.

FIELD OF THE INVENTION

The present invention relates to a communications terminal for performing communications under a communications protocol having higher security than the Internet protocol.

BACKGROUND OF THE INVENTION

A communications terminal such as a personal computer is known for example to be capable of communicating by way of an internal communications unit with an external communications terminal by way of the Internet (TCP/IP protocol). Also known on the other hand is that by adding for example, position detection functions to wireless telephones such as cell phones and mobile phones, important information such as one's own position information may be exchanged by wireless communications.

An evaluation is made of interrupting communications based on the address of that connected communications terminal, accessing the communications terminal and communicating over the Internet when there is a request from another person to quickly acquire important information such as position information while the wireless telephone is connected to the Internet. However maintaining a high level of security during this process is difficult due to the characteristics of the Internet.

SUMMARY OF THE INVENTION

The present invention therefore has an object of providing a communications terminal and a system for avoiding the possibility of information leaking over the Internet when communicating important information on a communications terminal capable of connecting to the Internet.

A communications terminal according to one aspect of the present invention has an Internet address for connection to the Internet through a communications line. The communication terminal determines whether a communications request specifying the address is received from a server when connected to the Internet, and disconnects the communications line when the communications request is received. The communication terminal then waits to receive an incoming call from the server, and communicates by way of the communications line with a communications protocol having a higher degree of security compared with an Internet communications protocol when an incoming call is received. Preferably, the communications terminal prohibits making of calls for a specified period of time after the communications line is disconnected.

A communications terminal according to another aspect of the present invention transmits a communications request to the server for requesting communications by the communications protocol having a higher degree of security compared with the communications protocol of the Internet when connected to the Internet. The communications terminal disconnects the communications line when the communications request is sent, and waits to receive an incoming call from the server when the communications line is disconnected. The communications terminal communicates by the communications protocol having a higher degree of security compared with the communications protocol of the Internet when the incoming call is received.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

Figure 1:
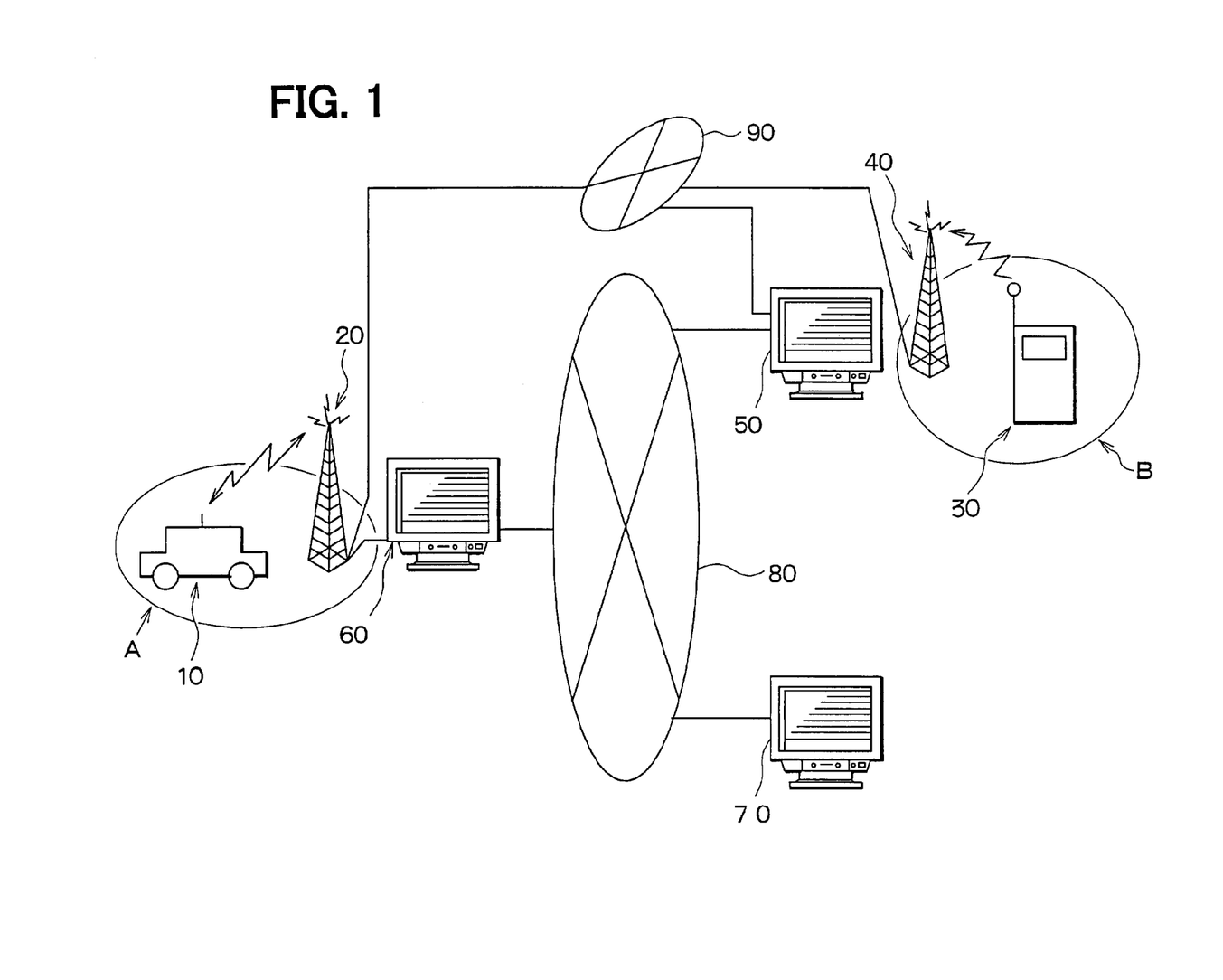
FIG. 1 is a schematic diagram showing a concept of a communications network system.

Referring first to FIG. 1, a communications network system is comprised of a mobile phone 10, a base station 20, a cell phone 30, a base station 40, an emergency communications server 50, a gateway server 60, an information distribution server 70, the Internet 80, and a public telephone network 90.

The mobile phone 10 receives a down-link signal in the wireless area A from the base station 20 and transmits an up-link signal to the base station 20. When the up-link signal from the mobile phone 10 is received, the base station 20 transmits that up-link signal to the emergency communications server 50 by way of the gateway server 60 or the public telephone network 90. The base station 20 transmits the down-link signal sent from the gateway server 60 or the emergency communications server 50 to the mobile phone 10.

The cell phone 30 in the wireless area B receives a down-link signal from the base station 40 and transmits an up-link signal to the base station 40 using radio waves as the medium. The base station 40 transmits the up-link signal from the cell phone 30 by way of the public telephone network 90 to the emergency communications server 50. When the down-link signal from the emergency communications server 50 is received by way of the public telephone network 90, the base station 40 transmits this down-link signal to the cell phone 30.

When an emergency communications request for emergency contact is received from the cell phone 30 by way of the base station 40 and the public telephone network 90, the emergency communications server 50 transmits this emergency communications request over the Internet 80 by way of the base station 20 to the mobile phone 10 and also over the public telephone network 90 by way of the base station 20 to the mobile phone 10.

A dedicated protocol is utilized so that the cell phone 30 can communicate the emergency communications request to the emergency communications server 50. A dedicated protocol is also utilized for carrying out emergency communications between the emergency communications server 50 and the mobile phone 10 in response to the emergency communications request. Unlike the TCP/IP protocol (Internet protocol), this type of dedicated protocol is set for a high level of security to prevent the contents of the communications between the emergency communications server 50 and the mobile phone 10 from leaking to other locations.

The gateway server 60 fulfills the role of an Internet provider performing the process of relaying communications of the mobile phone 10 by way of the Internet 80. The information distribution server 70 distributes various types of information over the Internet 80 to the mobile phone 10.

Figure 2:
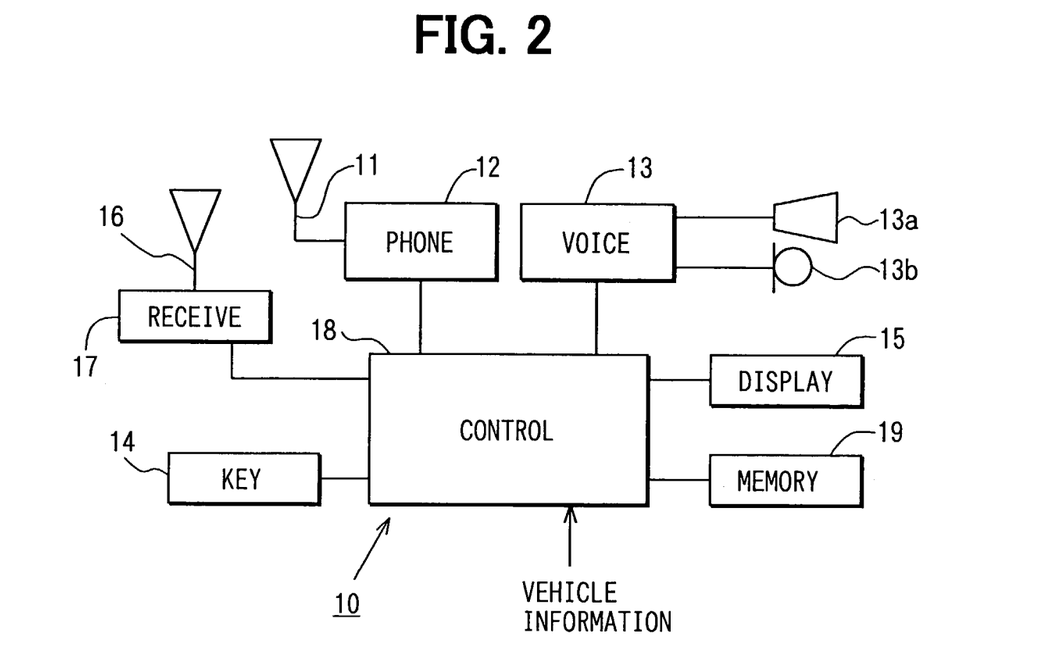
FIG. 2 is a block diagram showing a circuit structure of a mobile phone used in the system shown in FIG. 1.

As shown in FIG. 2, the mobile phone 10 is comprised of an antenna 11, a phone unit (communications unit) 12, a voice processor 13, a speaker 13a, a microphone 13b, a key panel 14, a display panel 15, a GPS (Global Positioning System) antenna 16, a GPS receiver 17, a control unit 18, and a memory 19.

The phone unit 12 demodulates the down-link signal from the base station 20 received by way of the antenna 11 and outputs the reception signal. The phone unit 12 also modulates the transmission signal and transmits the up-link signal from the antenna 11 to the base station 20.

The voice processor 13 performs analog-to-digital conversion of a voice signal from the microphone 13b and outputs the transmission signal. The voice processor 13 also performs digital-to-analog conversion of the reception signal and outputs a voice signal to the speaker 13a. The key panel 14 contains switches assigned for each function such as calling and clearing functions. Switch signals from these switches are input to the control unit 18.

The display panel 15 may for example be a liquid crystal display panel driven by the control unit 18 for showing various types of displays. The GPS antenna 16 receives respective satellite signals from artificial satellites. The GPS receiver 17 outputs the satellite signals from the GPS antenna 16 to the control unit 18.

The control unit 18 is configured to contain a microcomputer and performs processing including acquisition of current position information, emergency contact, connection to the Internet 80 and calls, etc. The memory 19 stores computer programs such as the browser program, data for executing those computer programs and the IP address (Internet address). This IP address is assigned beforehand to the mobile phone 10 itself.

Figure 3:
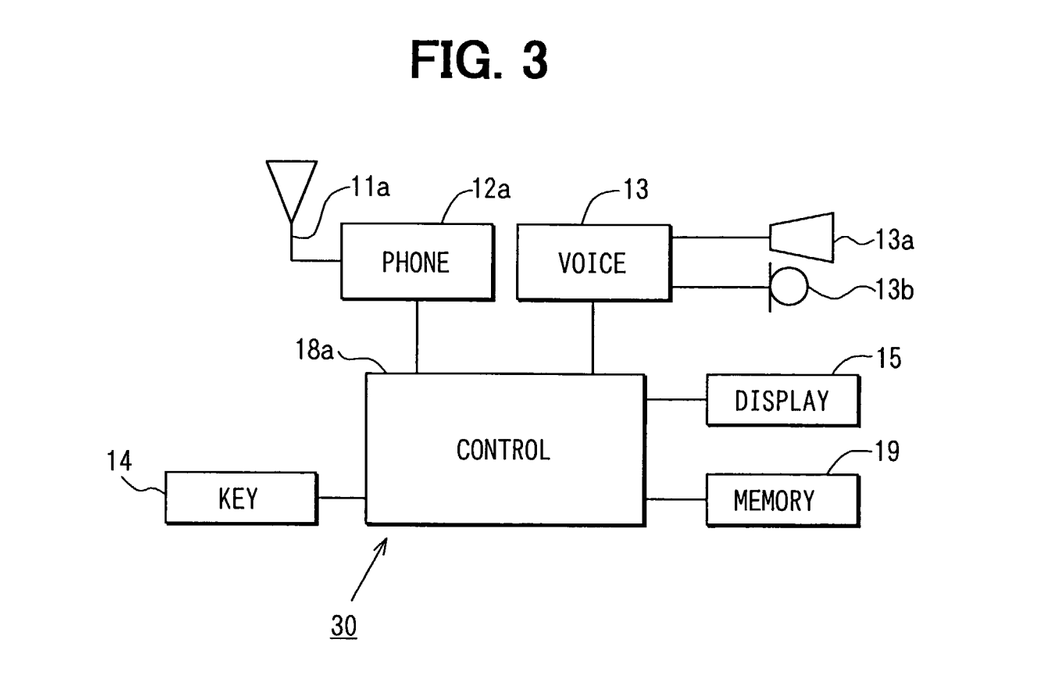
FIG. 3 is a block diagram showing a circuit structure of a cell phone used in the system shown in FIG. 1.

As shown in FIG. 3, the cell phone 30 is comprised of an antenna 11a, a phone unit 12a, a voice processor 13, a speaker 13a, a microphone 13b, a key panel 14, a display panel 15, a control unit 18a, and a memory 19.

The phone unit 12a demodulates the down-link signal from the base station 40 received by way of the antenna 11a and outputs the reception signal. The phone unit 12a also modulates the transmission signal and transmits the up-link signal from the antenna 11a to the base station 40. The control unit 18a performs processing such as making Internet connections, emergency communications requests and calls, etc. The remainder of the structure is essentially similar to the mobile phone 10 shown in FIG. 2. The IP address is assigned beforehand to the cell phone 30 itself.

Figure 4:
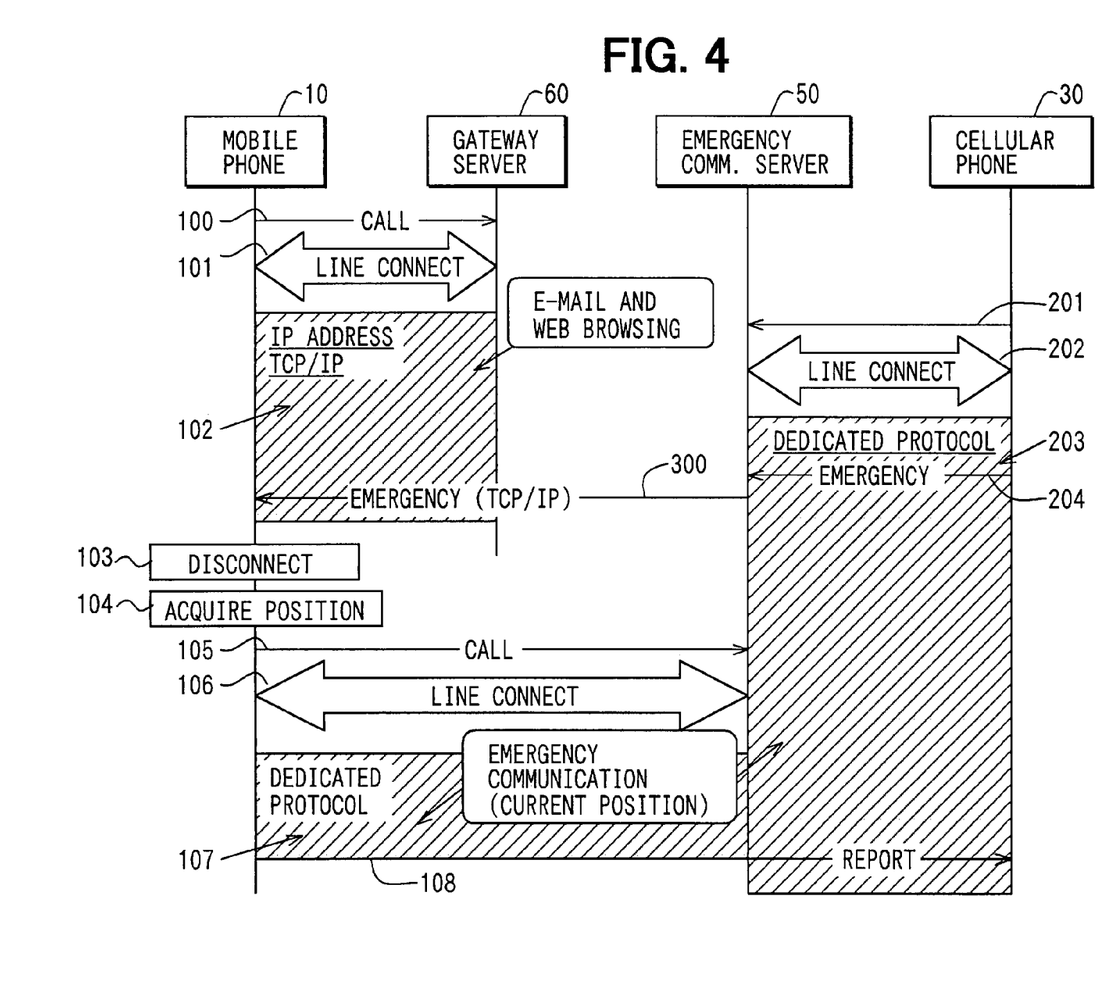
FIG. 4 is a timing diagram showing a communications sequence of the system shown in FIG. 1.

The operation of this embodiment is described next while referring to FIG. 4. FIG. 4 is a timing chart showing the communications sequence of the mobile phone 10, the cell phone 30, the emergency communications server 50 and the gateway server 60 in the communications network system. This communications sequence is a sequence in which the user of the cell phone 30 must urgently (emergency) learn the current position of a vehicle having the mobile phone 10.

The mobile phone 10 having the IP address first of all designates that telephone number to the gateway 60 by way of the base station 20 and makes a telephone call (step 100). A telephone line (communications line) connection is then made between the mobile phone 10 and the gateway server 60 (step 101).

When the mobile phone 10 then transmits its own IP address to the gateway server 60 by way of the base station 20 in order to ask for approval to connect to the Internet 80, the gateway server 60 verifies the IP address of the mobile phone 10, approves connecting to the Internet 80, and connects the mobile phone 10 to the Internet 80. The mobile phone 10 in this way establishes TCP/IP protocol communications with the gateway server 60 (step 102). Here, for example, while executing a browser program, the mobile phone 10 can download image data for displaying a desired homepage from the information distribution server 70 over the Internet 80 by way of the gateway server 60.

While the mobile phone 10 is connected to the Internet 80, the cell phone 30 can in this way designate that telephone number to the emergency communications server 50 over the public telephone network 90 by way of base station 40 and make a telephone call (step 201). A telephone line (communications line) connection is then made between the cell phone 30 having the IP address and the emergency communications server 50 and communications is performed by dedicated protocol (step 202, step 203) that is exclusive to this communications.

The cell phone 30 at this point transmits the emergency communications request to the emergency communications server 50 using the dedicated protocol (step 204). This emergency communications request specifies the IP address of mobile phone 10 so the mobile phone 10 can be made to make emergency contact sending its current position.

Next, when the emergency communications request is received from the cell phone 30, the emergency communications server 50 transmits this emergency communications request over the Internet 80 by way of base station 20 to the mobile phone 10 (step 300).

The mobile phone 10 next terminates (disconnects) the telephone line connection between the mobile phone 10 and the gateway server 60 when the emergency communications request is received from the emergency communications server 50 (step 103). In other words, the mobile phone 10 terminates the connection with the Internet 80.

The mobile phone 10 also acquires current position information based on signals from the artificial satellites, specifies that telephone number to the emergency communications server 50 by way of the base station 20 and makes the telephone call (step 104, 105). The mobile phone 10 then connects by a telephone line connection to the emergency communications server 50 and communications by the dedicated protocol is performed (step 106, 107).

When the mobile phone 10 transmits its current position to the emergency communications server 50 by the dedicated protocol, the emergency communications server 50 reports that current position information from the mobile phone 10 to the cell phone 30 by the dedicated protocol (step 108).

Figure 5:
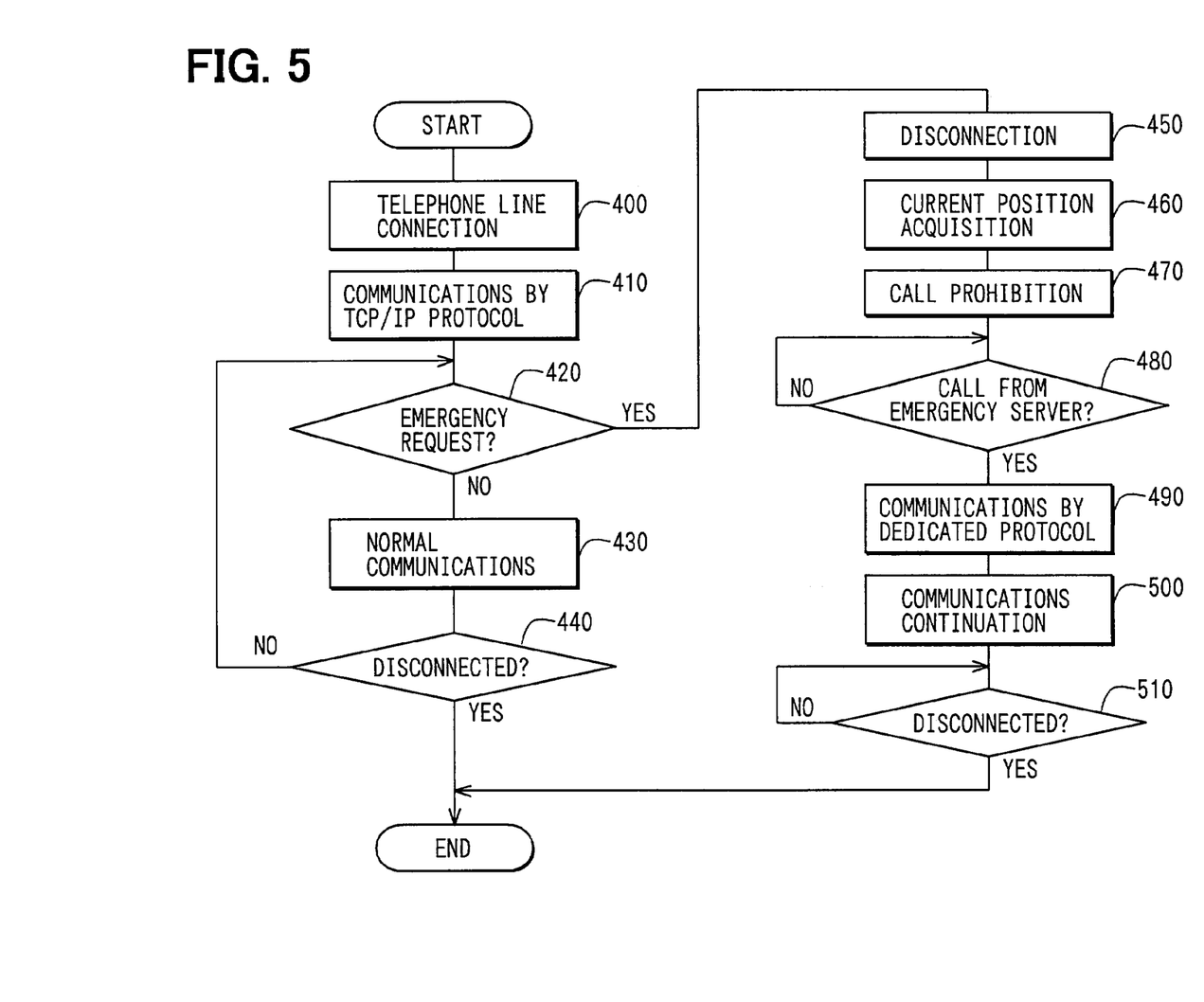
FIG. 5 is a flow chart showing an emergency contact process for the mobile phone in the system shown in FIG. 1.

The mobile phone 10 performs the emergency contact processing shown in FIG. 5 in order to implement the communications sequence described above. The control unit 18 executes the computer program according to the flow chart shown in FIG. 5.

The control unit 18 sends a signal to make a telephone line connection to the gateway server 60 and establishes communications by TCP/IP protocol with the gateway server 60 (steps 400, 410).

The control unit 18 next determines whether an emergency communications request for the mobile phone IP address is received from the gateway server 60 (step 420). If determined that no emergency communications request is received, then normal communications by TCP/IP protocol continues until the telephone line connection is disconnected (disconnected) and the process returns to step 420.

The control unit 18 terminates the telephone line connection with the gateway server 60 (step 450), when determined that an emergency communications request from the gateway server 60 is received in step 420.

The current position of the applicable mobile phone 10 is acquired next (step 460). More specifically, the arrival times required for satellite signals from each artificial satellite to reach the cell phone are found based on the output signal from the GPS receiver 17. The respective distances from each satellite to the mobile phone are then found based on these arrival times. The latitude and longitude of the current position are also found by the triangulation method based on the respective distances and stored in the memory 19.

Calls from the mobile phone 10 are then prohibited for a specified period of time and the control unit 18 waits to receive an incoming call signal from the emergency communications server 50 (steps 470, 480). When an incoming call signal from the emergency communications server 50 is received by way of the base station 20 over public telephone network 90, a telephone line connection is made with the emergency communications server 50 (step 480). Communications by the dedicated protocol is also established with the emergency communications server 50 (step 490).

The latitude and longitude of the current position are then called up from the memory 19. The latitude and longitude of the current position are continually sent to the emergency communications server 50 by the dedicated protocol as long as there is still a telephone line connection with the emergency communications server 50 (steps 500, 510).

In the embodiment described above, when the mobile phone 10 is connected to the Internet 80, the control unit 18 determines whether the emergency communications request with the specified IP address is received. When the control unit 18 determines that this emergency communications request is received, the telephone line connection is disconnected. When this telephone line connection is disconnected the mobile phone 10 (via control unit 18) awaits a call from the emergency communications server 50 in order to respond to the emergency communications request.

A call from the emergency communications server 50 is awaited in this way. When a call from the emergency communications server 50 is received, the telephone line connection with the emergency communications server 50 is established and communications by the dedicated protocol is performed. The mobile phone 10 can in this way cancel the connection with the Internet 80 and switch to communications with a higher degree of security for emergency communications.

Here, after disconnecting the telephone line connection, the making of calls by the mobile phone 10 is prohibited for a specified period of time to await the incoming call from the emergency communications server 50 to handle the emergency communications request. By prohibiting the making of calls for a specified period of time after disconnecting the telephone line connection in this way, calls from the emergency communications server 50 can definitely be received.

Figure 6:
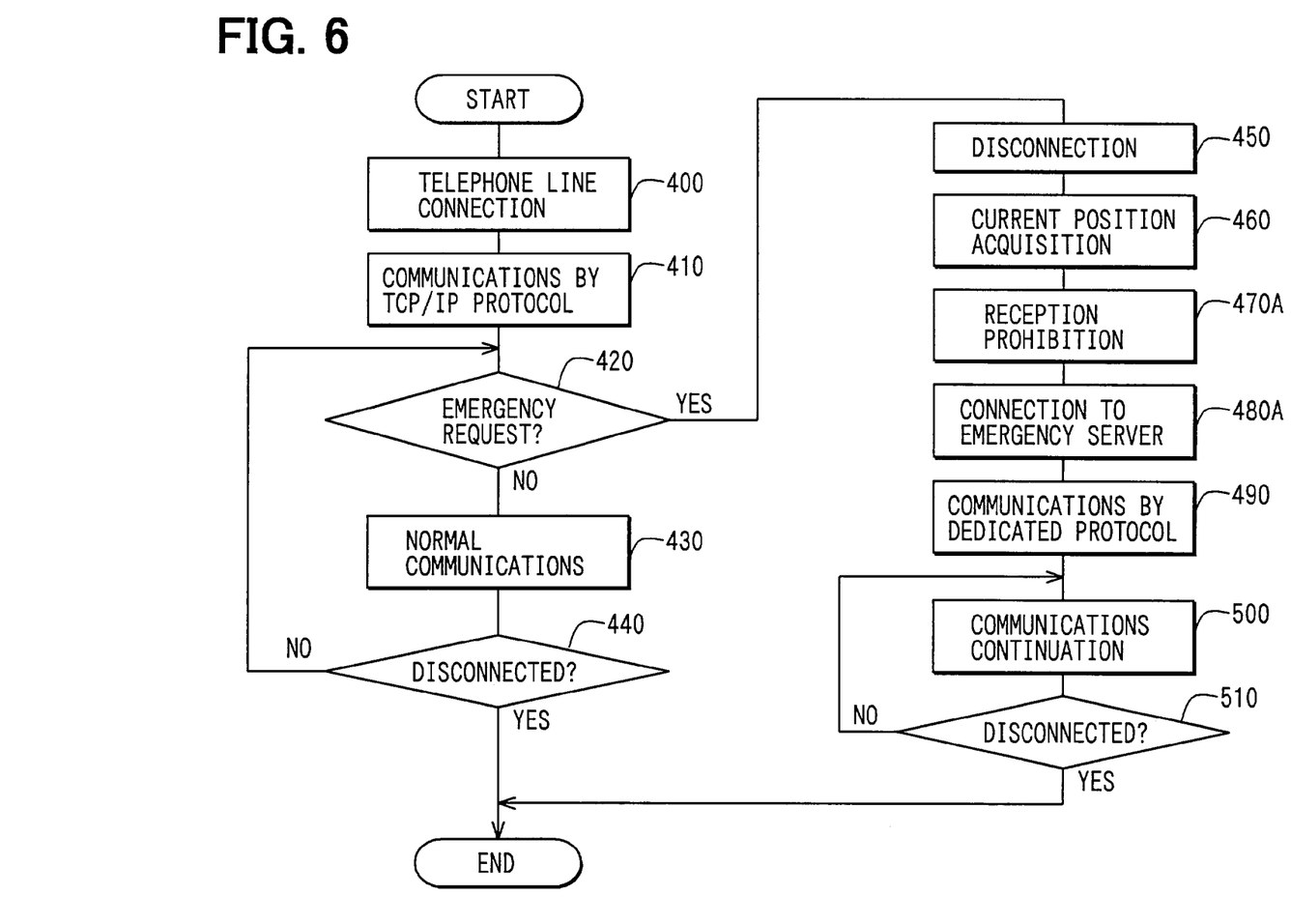
FIG. 6 is a flow chart showing a variation of the emergency contact process in the system shown in FIG. 1.

In this above embodiment, the telephone line connection with the gateway server 60 is disconnected for the mobile phone 10 to await the incoming signal from the emergency communications server 50. However, calls may be made to the emergency communications server 50 when the telephone line connection with the gateway server 60 is disconnected. The emergency contact processing in this case is shown in FIG. 6. Reference numerals in FIG. 6 that are identical to those in FIG. 5 have similar processing.

The telephone line connection is first made with the gateway server 60 and communications by the TCP/IP protocol is established (step 400, 410). When the control unit 18 then determines that an emergency contact request for the mobile phone IP address is received from the gateway server 60, the telephone line connection with the gateway server 60 is disconnected (step 450).

Next, the current position of the applicable mobile phone 10 is acquired (step 460). The receiving of incoming calls is also prohibited for a specified time and that telephone number is specified and sent to the emergency communications server 50 (step 470A). A telephone line connection is then made with the emergency communications server 50 and communications by the dedicated protocol is established with the emergency communications server 50 (step 480A, 490). The processing in steps 500 and 510 is then performed.

In this case also, communications can be switched from the connection with the Internet 80 to other communications method having a high degree of security for making emergency contact. Furthermore, the making of calls is prohibited for the specified period of time after the telephone line connection is disconnected in order to make calls to the emergency communications server 50 for responding to the emergency communications request so that the sending of a call to the emergency communications server 50 can definitely be performed.

Still further, in the embodiment, a desired home page is downloaded during execution of a browser program while the mobile phone 10 is connected to the Internet 80. However, an electronic mail (E-mail) program (mailer) may be executed for sending and receiving mail.

In the embodiment, the cell phone 30 sends the emergency communications request and also the mobile phone 10 receives the emergency communications request. However, the mobile phone 10 may also send an emergency communications request and the cell phone 30 may receive an emergency communications request.

In the embodiment, the mobile phone 10 receives the emergency communications request from the emergency communications server 50 for switching to communications with a high degree of security and terminates the telephone line connection. However, the mobile phone 10 may send an emergency communications request to the emergency communications server 50 for switching to communications with a high degree of security and terminates the telephone line connection.

More specifically, the mobile phone 10 possesses a transmitting function for transmitting an emergency communications request to the emergency communications server 50 for requesting communications by the dedicated protocol when connected to the Internet; a disconnecting function for disconnecting the telephone line connection when the transmitting function has transmitted an emergency communications request; a waiting function for awaiting an incoming call from the emergency communications server 50 when the telephone line connection has been disconnected by this disconnecting function; and a communicating function for communicating on the telephone line connection by dedicated protocol by the phone unit 12 when a call is received by this waiting function.

The mobile phone 10 may be structured to possess a transmitting function for transmitting an emergency communications request to the emergency communications server 50 for requesting communications by dedicated protocol when connected to the Internet; a disconnecting function for disconnecting the telephone line connection when the transmitting function has transmitted an emergency communications request; and a communicating function to make a call to the emergency communications server 50 by the phone unit 12 when the telephone line connection is disconnected by the disconnecting function, and communicate on the telephone line connection by dedicated protocol.

In the embodiment, the user of the cell phone 30 is assumed to urgently (emergency) know the current position information of the mobile phone 10. However, when the user of the cell phone 30 must urgently (emergency) know vehicular information such as the driving status or breakdown information on the applicable vehicle, the mobile phone 10 may send the vehicular information to the cell phone 30 by way of the emergency communications server 50. The cell phone 30 may also make a telephone call to the mobile phone 10 by way of the emergency communications server 50 for communications with a high degree of security utilizing a dedicated protocol.

In the embodiment, the emergency communications server 50 receives an emergency communications request from the cell phone 30 and promptly sends the emergency communications request over the Internet 80 to the mobile phone 10. However, when an emergency communications request is received from the cell phone 30, the emergency communications server 50 may send this emergency communications request over the Internet 80 after a specified period to the mobile phone 10.

In the embodiment, the cellular phone 30 is used as the communications terminal capable of connecting to the Internet 80 (communications network). However, communications terminals of different types such as PHS, mobile phones and fixed telephones may be utilized.

What is claimed is:

1. A communications terminal having an Internet address for connection to the Internet through a first communications line, the communications terminal comprising:
    a communications unit for connecting the Internet using the Internet address through the first communications line;
    determination means for determining whether a communications request specifying the Internet address is received from a server through the first communications line when the communications terminal is connected to the Internet;
    disconnecting means for disconnecting the first communications line when determined by the determination means that the communications request has been received;
    waiting means for waiting to receive an incoming call from the server through a second communications line for responding to the communications request after the first communications line is disconnected by the disconnecting means; and
    communicating means for communicating by way of the communications unit on the second communications line using a communications protocol having a higher degree of security compared with an Internet communications protocol after the incoming call is received from the server by the waiting means; wherein
    the second communications line is different than the first communications line.

2. A communications terminal according to claim 1 further comprising:
    call prohibiting means for prohibiting making of calls for a specified period of time after the first communications line is disconnected by the disconnecting means.

3. A communications terminal having an Internet address for connection to the Internet through a communications line, the communications terminal comprising:
    determination means for determining whether a communications request specifying the Internet address is received from a server through the first communications line when the communications terminal is connected to the Internet;
    disconnecting means for disconnecting the first communications line when determined by the determination means that the communications request has been received; and
    communicating means for making a call to the server and communicating by the communications unit on a second communications line with a communications protocol having a higher degree of security compared with an Internet communications protocol after the first communications line is disconnected by the disconnecting; wherein
    the second communications line is different than the first communications line.

4. A communications terminal according to claim 3, further comprising:
    call prohibiting means for prohibiting making of calls for a specified period of time after the first communications line is disconnected by the disconnecting means.

5. A communications network system comprising:
    a communications terminal that has an Internet address for connection to the Internet through a first communications line; and
    a server for sending a communications request specifying the Internet address of the communications terminal when connected to the Internet,
    wherein the communications terminal includes
        determination means for determining whether a communications request specifying the Internet address is received from the server through the first communications line when the communications terminal is connected to the Internet,
        disconnecting means for disconnecting the first communications line when determined by the determination means that the communications request has been received,
        waiting means for waiting to receive an incoming call from the server through a second communications line for responding to the communications request after the first communications line is disconnected by the disconnecting means, and
        communicating means for communicating by the communications unit on the second communications line with a communications protocol having a higher degree of security compared with an Internet communications protocol after an incoming call is received from the server by the waiting means; wherein
    the second communications line is different than the first communications line.

6. A communications network system comprising:
a communications terminal that has an Internet address for connection to the Internet through a first communications line; and
a server for sending a communications request specifying the Internet address of the communications terminal when connected to the Internet,
wherein the communications terminal includes
determination means for determining whether a communications request specifying the Internet address is received from a server through the first communications line when the communications terminal is connected to the Internet,
disconnecting means for disconnecting the first communications line when determined by the determination means that the communications request has been received, and
communicating means for the communications unit to make a call to the server and communicate on a second communications line by way of a communications protocol having a higher degree of security compared with an Internet communications protocol after an incoming call is received by the waiting means; wherein
the second communications line is different than the first communications line.

7. A communications terminal having an Internet address for connection to the Internet through a first communications line, the communications terminal comprising:
a communications unit for connecting to the Internet by the Internet address through the first communications line;
transmitting means for transmitting a communications request to a server for requesting communications through a second communications line using a communications protocol having a higher degree of security compared with a communications protocol of the Internet when connected to the Internet;
disconnecting means for disconnecting the first communications line after the communications request is sent from the transmitting means;
waiting means for waiting to receive an incoming call from the server through the second communications line after the first communications line is disconnected by the disconnecting means; and
communicating means for communicating by the communications unit on the second communications line using the communications protocol having a higher degree of security compared with the communications protocol of the Internet after the incoming call is received from the server by the waiting means; wherein
the second communications line is different than the first communications line.

8. A communications terminal having an Internet address for connection to the Internet through a first communications line, the communications terminal comprising:
a communications unit for connecting to the Internet by the Internet address through the first communications line;
transmitting means for transmitting a communications request to a server for requesting communications through a second communications line using a communications protocol having a higher degree security compared with a communications protocol of the Internet when connected to the Internet;
disconnecting means for disconnecting the first communications line after the communications request is sent from the transmitting means; and
communicating means for making a call to the server by the communications unit and communicating on the second communications line using the communications protocol having a higher degree of security compared with the communications protocol of the Internet after the first communications line is disconnected by the disconnecting means; wherein
the second communications line is different than the first communications line.

* * * * *